(12) United States Patent  
McCarville et al.

(10) Patent No.: US 8,932,423 B2  
(45) Date of Patent: Jan. 13, 2015

(54) METHOD FOR PRODUCING CONTOURED COMPOSITE STRUCTURES AND STRUCTURES PRODUCED THEREBY

(75) Inventors: Douglas A. McCarville, Orting, WA (US); Joseph L. Sweetin, Lake Forest Park, WA (US); Juan C. Guzman, Seattle, WA (US)

(73) Assignee: The Boeing Company, Chicago, IL (US)

(*) Notice: Subject to any disclaimer, the term of this patent is extended or adjusted under 35 U.S.C. 154(b) by 273 days.

(21) Appl. No.: 12/396,418

(22) Filed: Mar. 2, 2009

(65) Prior Publication Data

US 2009/0263618 A1    Oct. 22, 2009

Related U.S. Application Data

(63) Continuation-in-part of application No. 12/104,529, filed on Apr. 17, 2008.

(51) Int. Cl.
    *B32B 38/04*   (2006.01)
    *B29C 70/38*   (2006.01)
    *B29C 70/30*   (2006.01)
    *B29L 31/30*   (2006.01)

(52) U.S. Cl.
    CPC .............. *B29C 70/38* (2013.01); *B29C 70/30* (2013.01); *B29L 2031/3082* (2013.01)
    USPC ........... 156/211; 156/196; 156/212; 156/267; 156/250; 156/214

(58) Field of Classification Search
    CPC ........ B29C 53/36; B29C 65/02; B29C 65/20; B29C 66/442; B29C 66/0224; B29C 66/002241

USPC .......... 156/121, 196, 214, 285, 212, 211, 267  
See application file for complete search history.

(56) References Cited

U.S. PATENT DOCUMENTS

| 3,042,562 | A | * | 7/1962 | Peterson ..................... 428/98 |
| 3,259,021 | A | | 7/1966 | Appleton et al. |
| 3,556,922 | A | | 1/1971 | Green et al. |
| 3,775,219 | A | | 11/1973 | Karlson et al. |
| 4,133,711 | A | | 1/1979 | August et al. |

(Continued)

FOREIGN PATENT DOCUMENTS

| DE | 3223231 A1 | 1/1983 |
| DE | 3249987 C2 | 8/1995 |

(Continued)

OTHER PUBLICATIONS

International Search Report, dated Apr. 16, 2012, regarding Application No. PCT/US2011/066763, 13 pages.

(Continued)

*Primary Examiner* — Christopher Schatz  
(74) *Attorney, Agent, or Firm* — Yee & Associates, P.C.

(57) ABSTRACT

A contoured composite structure is fabricated by laying up a composite charge that includes at least one ply formed by uni-directional fiber pre-preg ply segments having substantially constant widths. The ply segments are placed in side-by-side, overlapping relationship with their longitudinal centerlines aligned in a polar orientation related to the contour of the structure. The charge is formed into the shape of the structure and cured.

18 Claims, 13 Drawing Sheets

(56) References Cited

U.S. PATENT DOCUMENTS

| | | | |
|---|---|---|---|
| 4,208,238 A | 6/1980 | August et al. |
| 4,249,704 A | 2/1981 | Sakaue et al. |
| 4,305,903 A | 12/1981 | Krause |
| 4,475,976 A | 10/1984 | Mittelstadt et al. |
| 4,541,886 A | 9/1985 | Marlow et al. |
| 4,576,849 A | 3/1986 | Gardiner |
| 4,588,466 A | 5/1986 | Eaton |
| 4,591,402 A | 5/1986 | Evans et al. |
| 4,696,707 A | 9/1987 | Lewis et al. |
| 4,707,214 A | 11/1987 | Nithart et al. |
| 4,720,255 A | 1/1988 | Mittelstadt |
| 4,726,924 A | 2/1988 | Mittelstadt |
| 4,750,965 A | 6/1988 | Pippel et al. |
| 4,847,063 A | 7/1989 | Smith |
| 4,867,834 A | 9/1989 | Alenskis et al. |
| 4,955,803 A | 9/1990 | Miller et al. |
| 5,038,291 A | 8/1991 | Wang et al. |
| 5,242,523 A | 9/1993 | Willden et al. |
| 5,292,475 A | 3/1994 | Mead et al. |
| 5,431,749 A | 7/1995 | Messner |
| 5,431,984 A | 7/1995 | Keck et al. |
| 5,492,979 A | 2/1996 | Pater |
| 5,538,589 A | 7/1996 | Jensen et al. |
| 5,648,109 A | 7/1997 | Gutowski et al. |
| 6,355,133 B1 | 3/2002 | Williams |
| 6,451,152 B1 | 9/2002 | Holmes et al. |
| 6,454,893 B1 | 9/2002 | McKague, Jr. |
| 6,547,910 B1 * | 4/2003 | Benzing et al. ............... 156/212 |
| 6,595,467 B2 | 7/2003 | Schmidt |
| 6,613,258 B1 | 9/2003 | Maison et al. |
| 6,723,271 B2 | 4/2004 | Hemphill et al. |
| 7,008,580 B2 | 3/2006 | Eberth et al. |
| 7,056,402 B2 | 6/2006 | Koerwien et al. |
| 7,115,180 B2 | 10/2006 | Bruyere |
| 7,134,629 B2 | 11/2006 | Johnson et al. |
| 7,137,182 B2 | 11/2006 | Nelson |
| 7,175,795 B2 | 2/2007 | Eberth et al. |
| 7,469,735 B2 | 12/2008 | Brown et al. |
| 7,513,769 B2 | 4/2009 | Benson et al. |
| 7,527,222 B2 | 5/2009 | Biornstad et al. |
| 7,544,261 B1 | 6/2009 | Vines et al. |
| 7,670,525 B2 | 3/2010 | Weidmann et al. |
| 7,790,082 B2 | 9/2010 | Buge et al. |
| 7,842,145 B2 | 11/2010 | Hogg |
| 7,943,076 B1 | 5/2011 | Hawkins et al. |
| 2002/0149134 A1 | 10/2002 | Hemphill et al. |
| 2003/0168775 A1 | 9/2003 | Eberth et al. |
| 2003/0173019 A1 | 9/2003 | Eberth et al. |
| 2004/0074587 A1 | 4/2004 | Koerwien et al. |
| 2005/0056362 A1 | 3/2005 | Benson et al. |
| 2005/0067731 A1 | 3/2005 | Bruyere |
| 2005/0263645 A1 | 12/2005 | Johnson et al. |
| 2006/0073309 A1 * | 4/2006 | Hogg ............................ 428/156 |
| 2006/0216480 A1 | 9/2006 | Weidmann et al. |
| 2006/0216490 A1 | 9/2006 | Ishii et al. |
| 2006/0249868 A1 | 11/2006 | Brown et al. |
| 2007/0029038 A1 | 2/2007 | Brown et al. |
| 2007/0161483 A1 * | 7/2007 | Raf ............................... 493/296 |
| 2008/0230652 A1 | 9/2008 | Biornstad et al. |
| 2009/0261199 A1 | 10/2009 | McCarville et al. |
| 2011/0097554 A1 | 4/2011 | Kehrl et al. |
| 2012/0076973 A1 | 3/2012 | Guzman et al. |

FOREIGN PATENT DOCUMENTS

| | | | |
|---|---|---|---|
| EP | 0496695 A2 | 7/1992 |
| EP | 1666353 A1 | 6/2006 |
| EP | 1800840 A1 | 7/2007 |
| EP | 1804146 A1 * | 7/2007 |
| EP | 1995040 A1 | 11/2008 |
| EP | 1995046 A2 | 11/2008 |
| EP | 2233625 A1 | 9/2010 |
| FR | 2515106 A1 | 4/1983 |
| FR | 2635484 A1 | 2/1990 |
| GB | 763972 A | 12/1956 |
| GB | 2467417 A | 8/2010 |
| JP | 2003317547 A | 11/2003 |
| JP | 2004276393 A | 10/2004 |
| WO | 9922932 A1 | 5/1999 |
| WO | 03099545 A1 | 12/2003 |
| WO | 2005011961 A1 | 2/2005 |
| WO | WO2006070015 A1 | 7/2006 |
| WO | 2006119002 A2 | 11/2006 |
| WO | WO2006136560 A1 | 12/2006 |
| WO | 2007018935 A1 | 2/2007 |
| WO | 2009129007 A2 | 10/2009 |
| WO | 2010101741 A2 | 9/2010 |
| WO | PCT/US2010/025110 | 11/2010 |

OTHER PUBLICATIONS

International Preliminary Report on Patentability, dated Jul. 30, 2013, regarding Application No. PCT/US2011/066763, 6 pages.

Notice of Allowance, dated Aug. 16, 2013, regarding U.S. Appl. No. 11/119,756, 16 pages.

Office Action, dated Jan. 11, 2013, regarding U.S. Appl. No. 11/119,756, 38 pages.

Kehrl et al., "Curved Composite Frames and Method of Making the Same," U.S. Appl. No. 13/684,988 and Preliminary Amendment, filed Nov. 26, 2012, 71 pages.

European Patent Office Communication, dated Oct. 14, 2009, regarding Application No. EP06769909.0, 3 pages.

Dickson et al., "Design and Analysis of a Stiffened Composite Fuselage Panel," NASA Contractor Report 159302, Aug. 1980, 52 pages.

"Fabrics and Preforms," In: ASM Handbook vol. 21: Composites, Miracle et al. (Eds.), ASM International, Materials Park, OH, pp. 64-65, Dec. 2001.

International Search Report dated Oct. 31, 2006, regarding Application No. PCT/US2006/027067 (WO2007018935), 2 pages.

International Search Report dated Feb. 15, 2007, regarding Application No. PCT/US2006/016191 (WO2006119002), 6 pages.

International Search Report dated Oct. 29, 2009, regarding Application No. PCT/US2009/037073 (WO2009129007), 4 pages.

UK search report dated May 10, 2010, regarding Application No. GB1000777.1 (GB2467417), 6 pages.

Shirinzadeh et al., "Trajectory generation for open-contoured structures in robotic fibre placement," Robotics and Computer-Integrated Manufacturing, vol. 23, pp. 380-394, Mar. 2007.

USPTO Office Action, dated Dec. 23, 2008, regarding U.S. Appl. No. 11/119,756, 13 pages.

USPTO Final Office Action, dated Jun. 18, 2009, regarding U.S. Appl. No. 11/119,756, 13 pages.

USPTO Office Action, dated Sep. 28, 2010, regarding U.S. Appl. No. 11/119,756, 18 pages.

USPTO Final Office Action, dated Feb. 14, 2011, regarding U.S. Appl. No. 11/119,756, 14 pages.

USPTO Office Action, dated Sep. 19, 2011, regarding U.S. Appl. No. 11/119,756, 14 pages.

USPTO Final Office Action, dated Feb. 29, 2012, regarding U.S. Appl. No. 11/119,756, 17 pages.

USPTO Office Action, dated Mar. 5, 2008, regarding U.S. Appl. No. 11/195,786, 15 pages.

USPTO Notice of Allowance, dated Aug. 25, 2008, regarding U.S. Appl. No. 11/195,786, 7 pages.

USPTO Office Action, dated Feb. 9, 2011, regarding U.S. Appl. No. 12/104,529, 17 pages.

Response to Office Action, dated May 4, 2011, regarding U.S. Appl. No. 12/104,529, 28 pages.

Revised Response to Office Action, dated Aug. 11, 2011, regarding U.S. Appl. No. 12/104,529, 30 pages.

USPTO Final Office Action, dated Oct. 28, 2011, regarding U.S. Appl. No. 12/104,529, 12 pages.

Response to Final Office Action, dated Jan. 30, 2012, regarding U.S. Appl. No. 12/104,529, 12 pages.

USPTO Office Action, dated Nov. 8, 2010, regarding U.S. Appl. No. 12/363,746, 17 pages.

USPTO Notice of Allowance, dated Mar. 29, 2011, regarding U.S. Appl. No. 12/363,746, 8 pages.

(56) References Cited

OTHER PUBLICATIONS

USPTO Office Action, dated Oct. 18, 2011, regarding U.S. Appl. No. 12/776,781, 15 pages.

Response to Office Action, dated Feb. 21, 2012, regarding U.S. Appl. No. 12/776,781, 31 pages.

Klenner, "Evaluation and Selection Algorithms of Cost-Optimised Prepreg Application Methods in the Context of Manufacturing Highly Stressed Aircraft Components of Fibre-Reinforced Plastic," Doctoral Dissertation, Technische Universität Carolo-Wilhelmina zu Braunschweig (DE), Apr. 5, 1988, pp. 9, 18-25, 55-56, 64-68, & 154-156.

Office Action, dated Jun. 3, 2013, regarding U.S. Appl. No. 13/684,988, 25 pages.

Office Action, dated May 23, 2013, regarding U.S. Appl. No. 13/013,097, 42 pages.

Amendment Pursuant to Request for Continued Examination, dated Aug. 9, 2012, regarding U.S. Appl. No. 12/776,781, 6 pages.

USPTO Notice of Allowance, dated Aug. 17, 2012, regarding U.S. Appl. No. 12/776,781, 10 pages.

USPTO final office action dated May 16, 2012 regarding U.S. Appl. No. 12/776,781, 26 Pages.

Office Action, dated Dec. 27, 2013, regarding U.S. Appl. No. 12/104,529, 52 pages.

Final Office Action dated Dec. 6, 2013, regarding U.S. Appl. No. 13/684,988, 14 pages.

Final Office Action, dated Nov. 19, 2013, regarding U.S. Appl. No. 13/013,097, 24 pages.

Office Action, dated May 21, 2014, regarding U.S. Appl. No. 13/013,097, 13 pages.

Final Office Action, dated Aug. 14, 2014, regarding U.S. Appl. No. 12/104,529, 17 pages.

* cited by examiner

METHOD FOR PRODUCING CONTOURED COMPOSITE STRUCTURES AND STRUCTURES PRODUCED THEREBY

CROSS REFERENCE TO RELATED APPLICATIONS

This application is a continuation-in-part of co-pending U.S. patent application Ser. No. 12/104,529 filed Apr. 17, 2008, the entire disclosure of which is incorporated by reference herein.

TECHNICAL FIELD

This disclosure generally relates to techniques for fabricating composite parts, and deals more particularly with a method for producing highly contoured non-Cartesian coordinate composite structures using unidirectional pre-impregnated composite tape and automated tape placement equipment.

BACKGROUND

Highly contoured, multi-leg structures having high strength and lightweight may be used in various applications, such as in aerospace vehicles. For example, aerospace frames, spars, ribs, stringers and similar structures, may have multiple legs which are contoured along the length of the structure. Fabricating such highly contoured structures from composite materials is challenging, and thus is largely limited to hand layup techniques which are not only labor intensive, but may not be well suited for high production volume applications. Automatic fiber placement (AFP) machines may be used to fabricate some forms of composite structures, however these machines may not be efficient for producing highly contoured, multi-leg structures with tight radii, in part because the more complicated structural features of these structures may require the machine to start and stop, as well as change directions relatively frequently. Moreover, certain structure configurations, such as those containing a Z or a J-cross section, may not be fabricated using AFP machines because they may not be able to load material at the inside corners of these structures.

Accordingly, there is a need for a method of fabricating contoured, and especially highly contoured, continuous composite structures containing multi-leg features that meet high performance specifications in a high volume production environment.

SUMMARY

The disclosed embodiments provide a method of fabricating highly contoured, continuous composite structures using unidirectional composite materials, such as pre-preg fiber tape. The method may provide for nearly unlimited orientation of plies with low distortion, consistent resin/fiber content and smooth surfaces. The resulting composite structures are lightweight and exhibit accurate feature placement which facilitates superior fit-up during aircraft assembly processes. The disclosed method may be employed to fabricate a wide range of structures including, but not limited to shear ties, stringers, frames, spars and ribs for aircraft and other vehicles.

Continuous, contoured composite structures may be fabricated in which constant width tape segments are placed and aligned in a manner so as to maintain polar fiber orientation during the fabrication of highly curved, multi-leg composite structures, such as frames, spars, ribs and stringers. The method may be carried out using automatic fiber tape placement equipment to quickly align and place tape segments with a minimum of machine head movements. The use of unidirectional pre-preg tape and highly accurate fiber placement without distortion may result in structures that are lower in weight compared to structures fabricated using alternate methods.

According to one disclosed embodiment, a method is provided for fabricating a contoured composite structure. The method includes laying up a composite charge, including at least one ply of unidirectional fiber, pre-preg ply segments having substantially constant widths. The ply segments are placed in side-by-side, overlapping relationship with the longitudinal centerlines of the ply segments aligned in a polar orientation that is related to the contour of the structure. The composite charge is formed substantially into the shape of the structure, and the shaped charge is then cured. The ply segments are placed in a manner that maintains a substantially constant amount of overlap between the ply segments. The ply segments may be formed by cutting a length of composite tape.

According to another disclosed embodiment, a method is provided for fabricating a contoured composite structure including producing a composite charge using an automatically controlled tape placement head. The head is used to place each of a plurality of substantially constant width pre-preg tape segments in side-by-side, overlapping relationship on a substrate. The head is also used to align the tape segments in a polar orientation that is related to the contour of the structure. The charge is formed substantially into the shape of the structure, and then cured. The ply segments are placed by moving the head across a substrate and cutting a length of composite tape into segments which are then placed by the head onto the substrate.

According to a further embodiment, a method is provided for forming a contoured composite frame section. The method includes forming a flat stack of fiber reinforced, pre-preg plies, including individually placing substantially constant width composite fiber tape segments in side-by-side, overlapping relationship, and in a polar orientation that is related to the contour of the structure. The method may include forming first and second legs of the frame section, and compacting and curing the formed stack.

The disclosed embodiments satisfy the need for a method of fabricating highly contoured composite structures, particularly those having multiple legs, which is well suited for use with automated tape placement machines in higher production environments.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
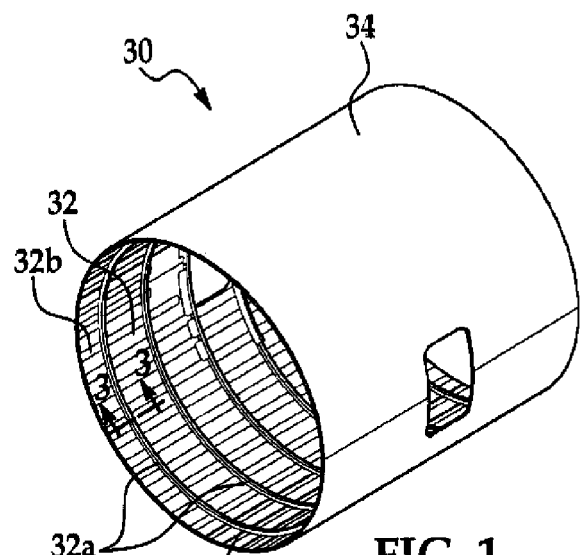
FIG. 1 is a perspective illustration of a barrel section of an aircraft fuselage.
Figure 2:
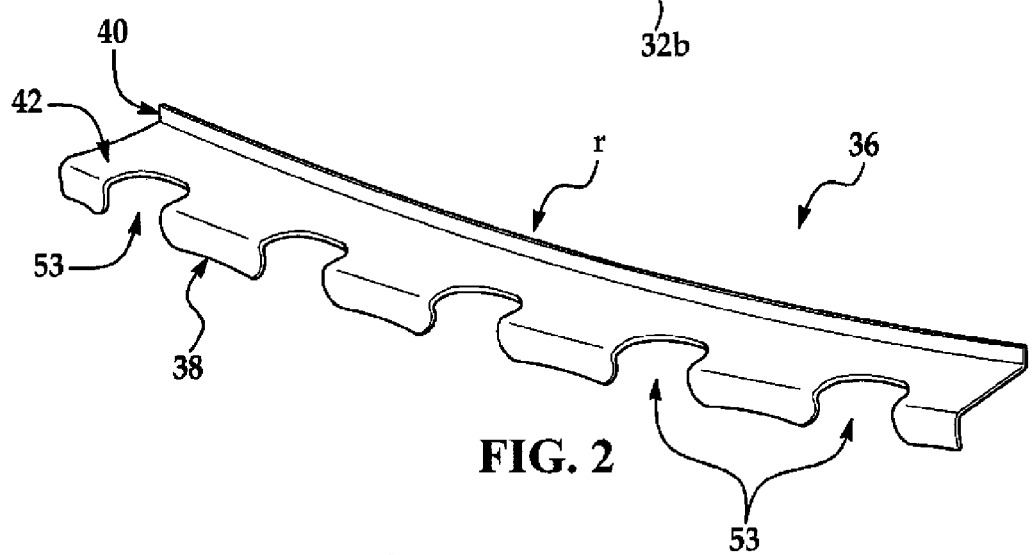
FIG. 2 is a perspective illustration of a highly contoured composite frame section used in the fuselage shown in FIG. 1.
Figure 3:
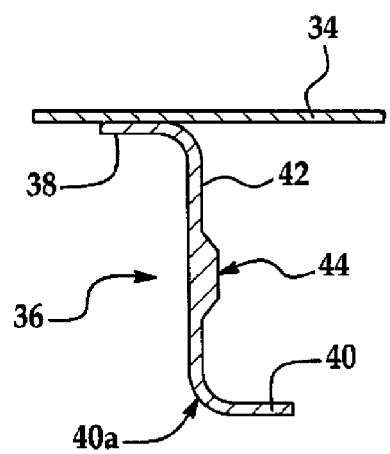
FIG. 3 is a sectional illustration taken along the line 3-3 in FIG. 1.

Referring first to FIGS. 1-3, a barrel shaped fuselage section 30 comprises an outer skin 34 formed over and fastened to a frame structure 32. The frame structure 32 comprises a plurality of longitudinally spaced, barrel frames 32a and longitudinally extending stringers 32b which pass through the barrel frames 32a. Each of the barrel frames 32a may comprise multiple frame sections 36 that are spliced together using any suitable means, such as without limitation, splice plates (not shown) and fasteners (not shown). In some applications however, half frame and full frame sections (not shown) may be possible.

Figure 4:
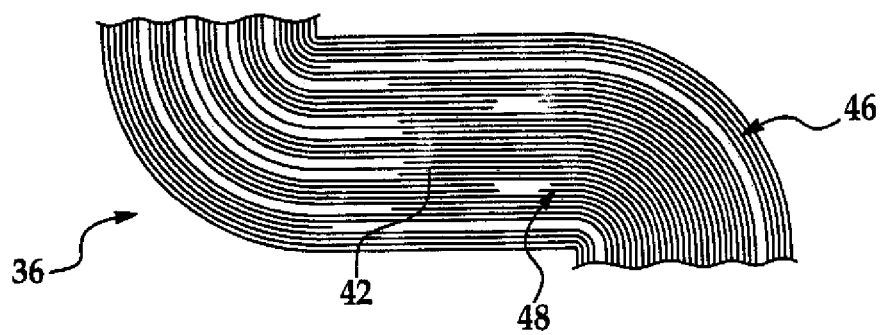
FIG. 4 is a sectional illustration showing a ply buildup for the frame section shown in FIG. 2.

As best seen in FIG. 3, the frame section 36 may have a generally Z-shaped cross section and includes an outer chord 38 connected to an inner chord 40 by a generally web 42. The outer and inner chords 38, 40, when viewed in cross section (FIG. 3), effectively form "legs" that extend traverse to the web 42. Thus as used herein, the terms "leg" and "legs" refer to one or more structural features such as, without limitation, caps or flanges that extend traverse to other features of a contoured structure such as, without limitation, a web. In the illustrated embodiment, the web 42 may include an optional reinforcing pad 44. The outer chord 38 forms a shear tie to which the skin 34 may be coupled and/or fastened. The outer chord 38 as well as one edge of the web 42 may include a plurality of spaced apart, mousehole-shaped cutouts 53 through which the stringers 32b extend. As will be discussed below, the frame section 36 is formed from laminated plies of a fiber reinforced synthetic resin, such as carbon fiber epoxy. As shown in FIG. 4, the frame section 36 may include a ply buildup comprising full plies 46 and partial plies 48 which are arranged and oriented to provide maximum structural performance while facilitating the use of a later discussed fabrication method that is both efficient and repeatable.

Figure 5:
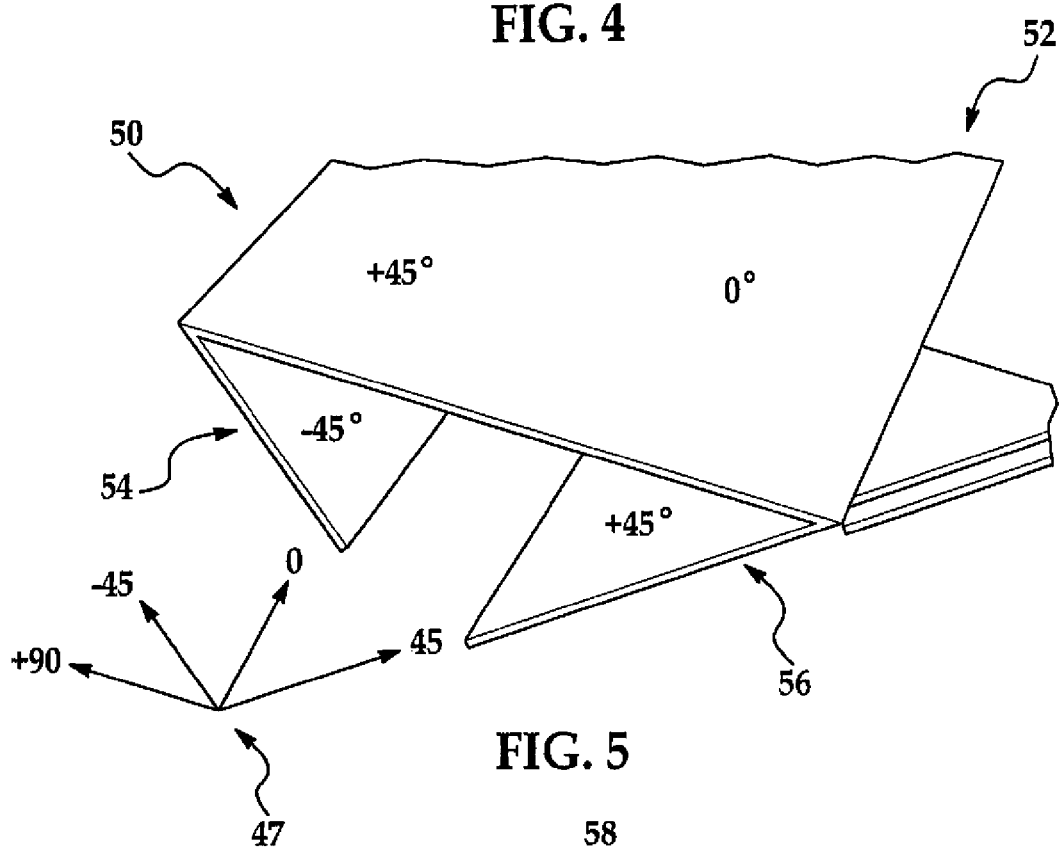
FIG. 5 is a perspective illustration of a flat ply stack used in the fabrication of the frame section shown in FIG. 2.
Figure 6:
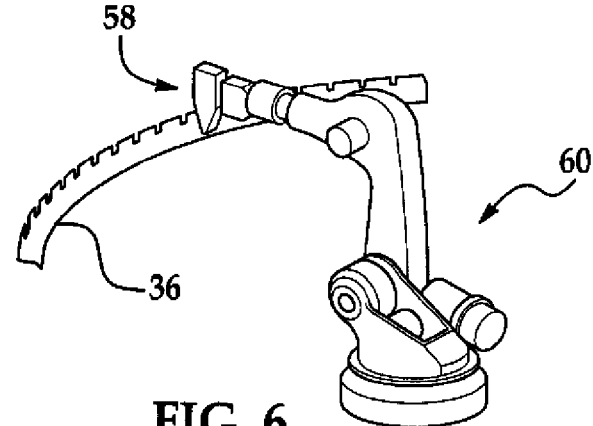
FIG. 6 is a perspective illustration of an AFP robotic machine used to place the stack of plies.
Figure 7:
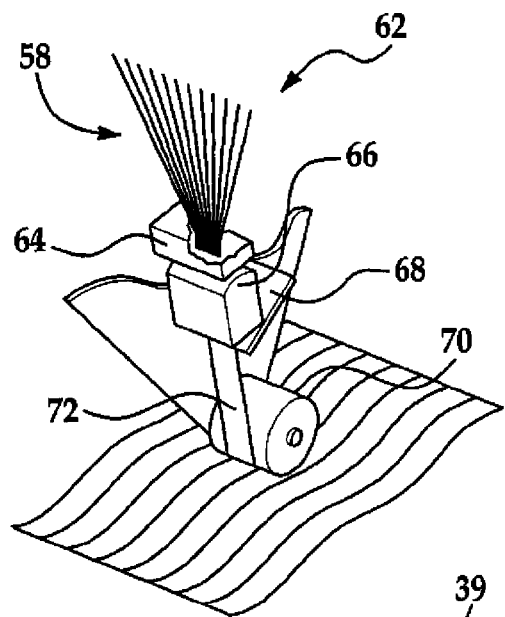
FIG. 7 is a perspective illustration of an AFP machine used as an end defector on the robot shown in FIG. 6.

Referring now to FIGS. 5-7, an AFP machine 58 may be used as an end effecter on a robot 60 to laydown fiber tows or strips of fiber pre-preg tape to form a flat ply stack 50. The AFP machine 58 may include combs 64 that receive incoming pre-preg tows 62 that pass through a ribonizer 66 before being severed by a tow cutter 68. The cut tows 72 pass beneath a compliant roller 70 that applies and compacts the tows 62 on a substrate (not shown) or an underlying ply layer (not shown). As best seen in FIG. 5, the AFP machine 58 may be used to laydown fiber tows 62 or tapes in which the fibers are oriented at preselected angles in a Cartesian coordinate system 47. In the illustrated example, the ply stack 50 includes fiber tows 52 oriented at 0 degrees, fiber tows 56 oriented at +45 degrees and fiber tows 54 oriented at −45 degrees. Not shown, but embedded in the ply stack 50 are fiber tows oriented at 90 degrees.

Figure 8:
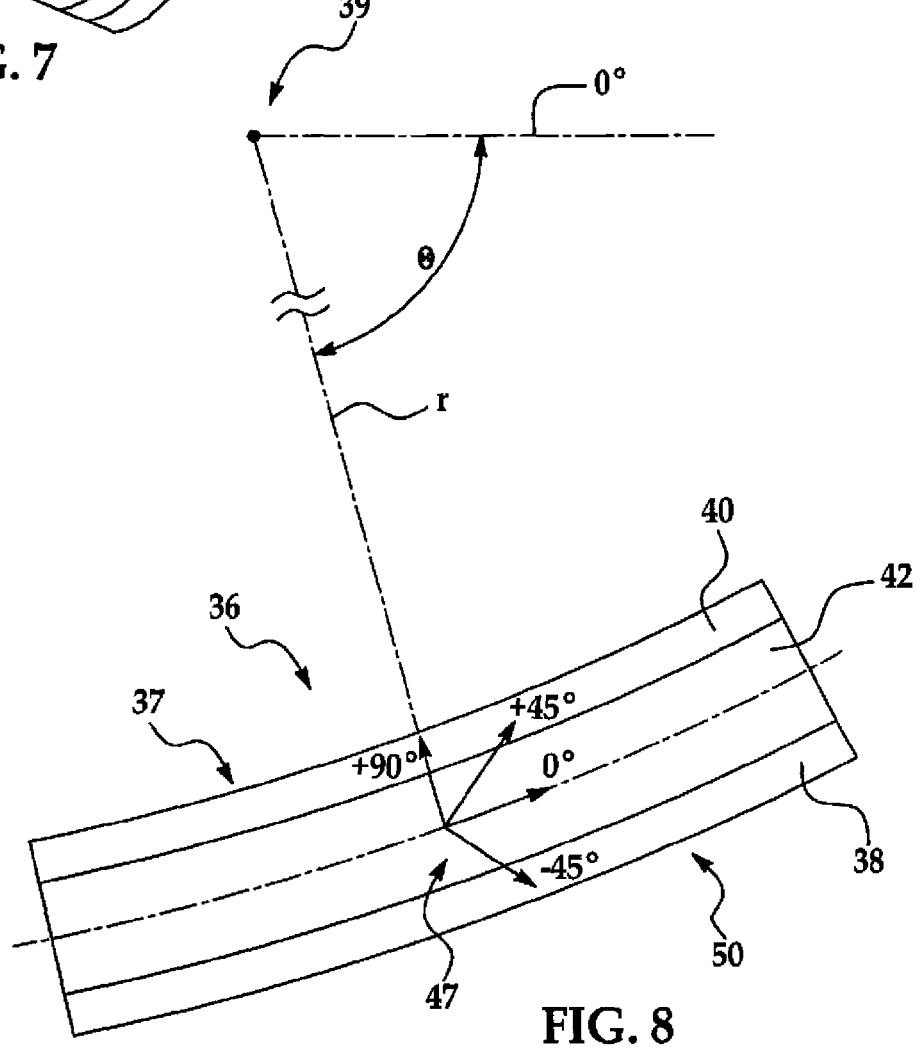
FIG. 8 is a diagrammatic illustration showing the polar and Cartesian coordinate systems used to define ply orientations in the frame section of FIG. 2.

FIG. 8 better illustrates the relationship between the orientation of a Cartesian coordinate system 47 in which the unidirectional fiber tows or tapes laid down in a ply stack 50, and a polar coordinate system that defines the contour of the frame section 36. The contour of the frame section 36, designated by the numeral 37, may be defined by a radial coordinate "r" originating from a pole 39 and forming a polar angle θ with respect to a reference coordinate indicated by 0 degrees. Thus, each contoured feature by the frame section 36 may be defined by a value "r" (radial coordinate) at an angle θ. It should be note here that although the illustrated frame section 36 has a constant radius (curvature) and the web 42 has a constant gauge (thickness), the curvature of the frame section 36, the gauge of the web 42, the gauge of the inner chord 40 and the gauge of the outer chord 38 each may be variable along the length of the frame section 36.

In the illustrated example, the ply stack 50 is formed by multiple plies 52 in which the unidirectional pre-preg fibers are oriented within a Cartesian coordinate system 47 that is tangentially aligned with the radial coordinate "r". As will be discussed below in more detail, in the illustrated example, fiber orientations of 0 degrees, −45 degrees, +45 degrees and +90 degrees are employed, however other angular orientations are possible, depending on a variety of factors, including the particular application, and the geometry of the frame section 36.

Figure 9:
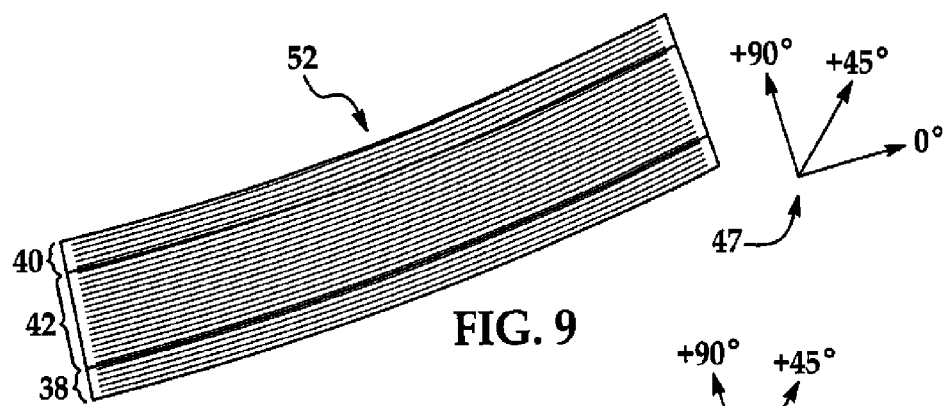
FIG. 9 is a plan illustration of a ply containing fibers oriented at 0 degrees.

Attention is now directed to FIGS. 9-12 which illustrate fiber orientation in several plies of a flat ply stack 50. FIG. 9 illustrates a ply 52 in which the tows or tape strips are laid down by the AFP machine 58 with a 0 degree orientation, extending the entire length of the frame section 36. As used herein, "tape" refers to preimpregnated unidirectional fibers, and "tows" may comprise tape that is slit along it length into narrow bands which may be, for example and without limitation, 0.125, 0.25 or 0.5 inches in width. A "course" refers to tows applied as a band by the AFP machine 58. "Drops" refer to the AFP machine 58 discontinuing one or more tows, and may comprise the distance between adjacent tows or tape. A cut/add convergent zone means that a course terminates at a course of different orientation within the same ply, thereby creating areas of gaps and overlaps.

The 0 degree plies 52 may be formed by using the AFP machine 58 to "steer" the laydown of slit tape in which conformability and drop-offs determine the width of the ply 52. A full ply 52 is illustrated in FIG. 9, however a partial ply or a ply with drop-offs is possible as well. The sections of the ply 52 which later will be formed into the outer chord, inner chord and web are respectively designated by the numerals 38, 40 and 42. It should be noted here that in some applications, the plies forming the outer chord 40 may be formed using a separate band of tows or layer of tape that is precut to width and placed on later discussed tooling, rather than being laid down using the AFP machine 58.

Figure 10:
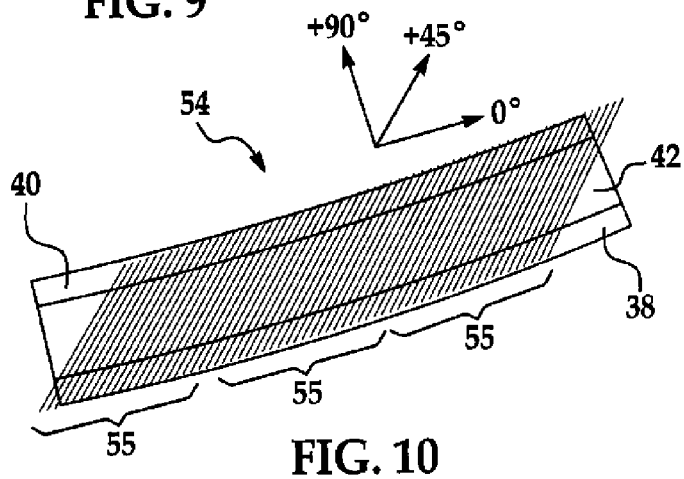
FIG. 10 is a diagrammatic illustration illustrating plies respectively containing fibers oriented at 45 and 90 degrees, and illustrating the use of tow and tape wedges.

The plies containing tows or tape oriented at angles other than 0 degrees are formed by side-by-side groups or segments 55, 74 of the tows/tapes that each has a tapered wedge shape. The segments 55, 74 may be formed using tape with up angle and drop allowance which determines the sides. For example, FIG. 10 illustrates a ply 54 formed by segments 55 in which the fiber orientation in each of the segments 55 is generally +45 degrees.

Figure 11:
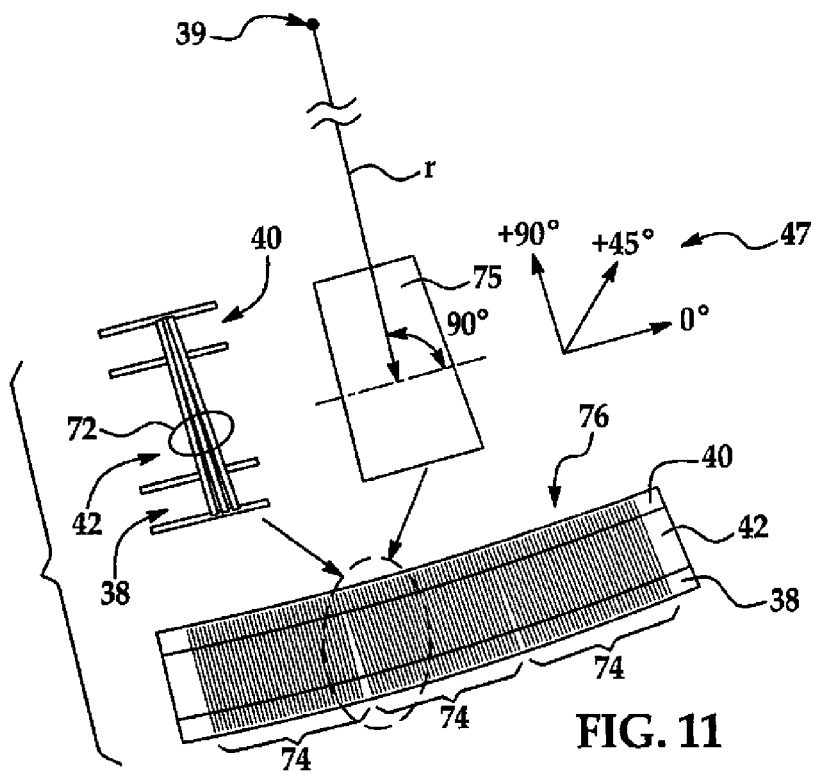
FIG. 11 is a perspective illustration of a flat stack of plies.

FIG. 11 illustrates a ply 76 formed by segments 74 arranged side-by-side, in which the fibers in each segment 74 are oriented generally at 90 degrees, substantially aligned with the angle of the radial coordinate "r" defining the contour 37 (FIG. 8) of the frame section 36. Where tows 72 are laid down to form the segments 74, the individual tows are angled in the direction of the curvature of the ply 76. The angled tows 72 are individually placed in side-by-side relationship to each other. Alternatively, the segments may be formed by tapered wedges 75 of fiber tape that are laid down in side-by-side relationship to each other by the AFP machine 58 or a similar apparatus.

Figure 12:
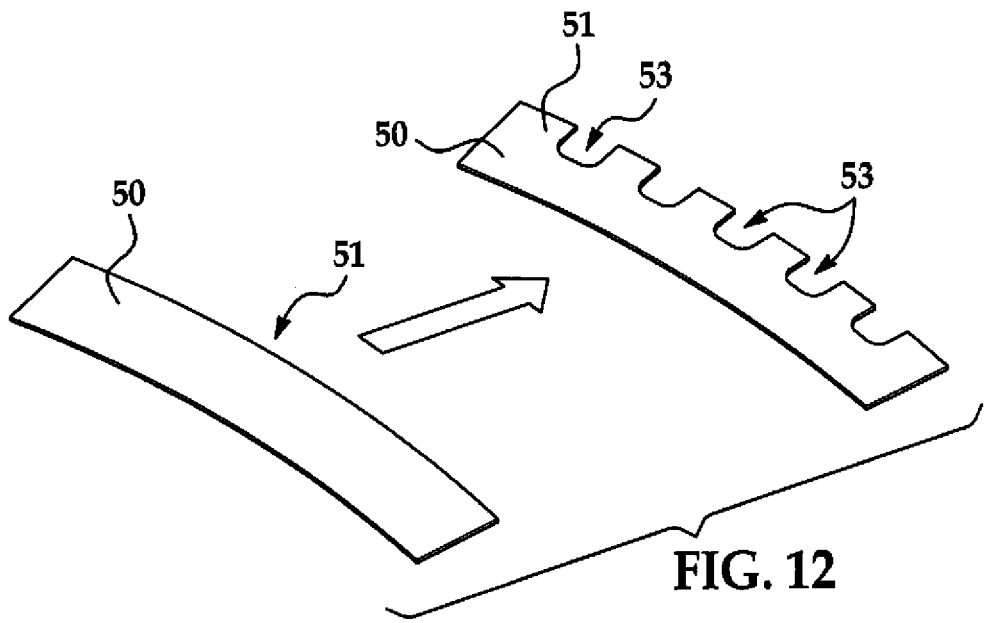
FIG. 12 is a perspective illustration similar to FIG. 11 but showing cut outs having been formed along one edge of the ply stack.

Referring now to FIG. 12, after the flat ply stack 50 has been fully placed, mousehole cutouts 53 may be created along one edge 51 of the ply stack 50. The cutouts 53 may be created using any of various techniques such as, by way of example and without limitation, using an NC controlled ultrasonic cutter (not shown).

In the illustrated example, the cutouts 53 provide openings through which the stringers 32b extend (FIG. 1). However, in other applications it may be desirable to provide similar cutouts 53 to reduce weight and/or reduce the possibility of ply wrinkling during subsequent fabrication processes.

Attention is now directed to FIGS. 13-17 which illustrate the formation of the inner chord 40 using a drape forming process. The ply stack 50 is placed on the upper flat surface 80a of a forming mandrel 80. The forming mandrel 80 includes a curved or contoured surface 80b which, in the illustrated example, forms a substantially 90 degree angle relative to the upper flat surface 80a. Any 0 degree plies that may be used to form the outer chord 40 are placed directly on the contoured surface 80b. An outer edge 50a of the ply stack 50 extends past the curved edge 80b and may be supported during ply placement by a layup shelf 86 that is subsequently moved to the position shown in FIG. 13. The forming mandrel 80 is supported on a vacuum bag tool 84, separated by a fiberglass breather 82. A vacuum bag 88 is placed over the ply stack 50 and forming mandrel 80. A breather 90 and a layer 92 of FEP (fluorinated ethylene propylene) may be placed between the bag 88 and the ply stack 50. The bag 88 can also have channels (not shown) on its inner surface, in which case the breather 90 is not required.

Figure 13:
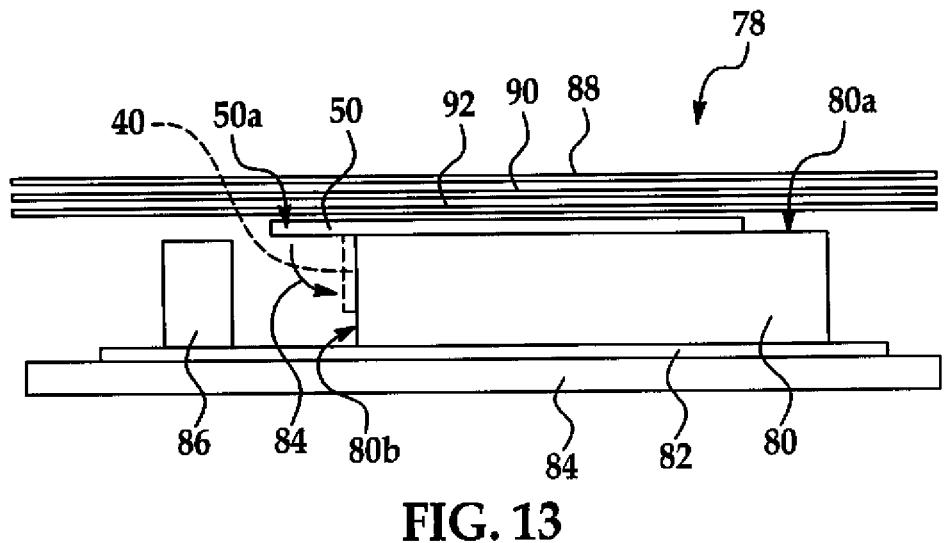
FIG. 13 is a cross sectional illustration showing a drape forming apparatus used to drape form an inner chord of the frame section.
Figure 14:
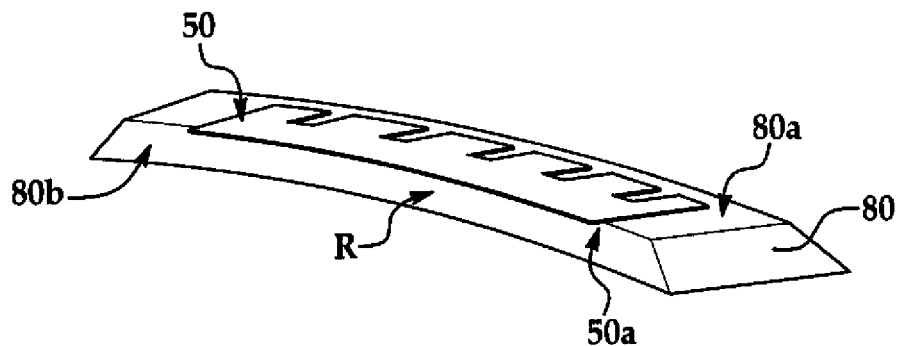
FIG. 14 is a perspective illustration of a flat ply stack positioned on a forming mandrel comprising part of the drape forming apparatus of FIG. 13.
Figure 15:
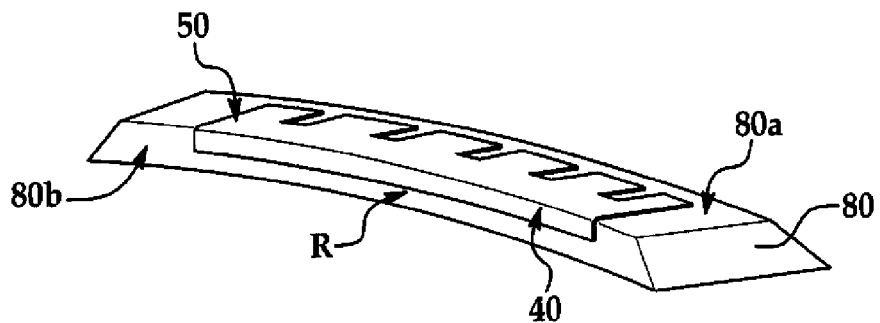
FIG. 15 is an illustration similar to FIG. 14 but showing the inner chord having been fully formed around the forming mandrel.

With the edge 50a of the ply stack 50 draped over the tool edge 80b, a vacuum is drawn in the bag 88 which applies pressure to the ply stack 50, causing the edge 50a to bend downwardly in the direction of the arrow 94 in FIG. 13 until the edge 50a lies substantially flat against and substantially assumes the contour of the forward face 80b of the forming mandrel 80. A ply stack edge 50a is thus formed into the inner chord 40 having a radius substantially identical to the radius R of the forward tool face 80b.

Figure 16:
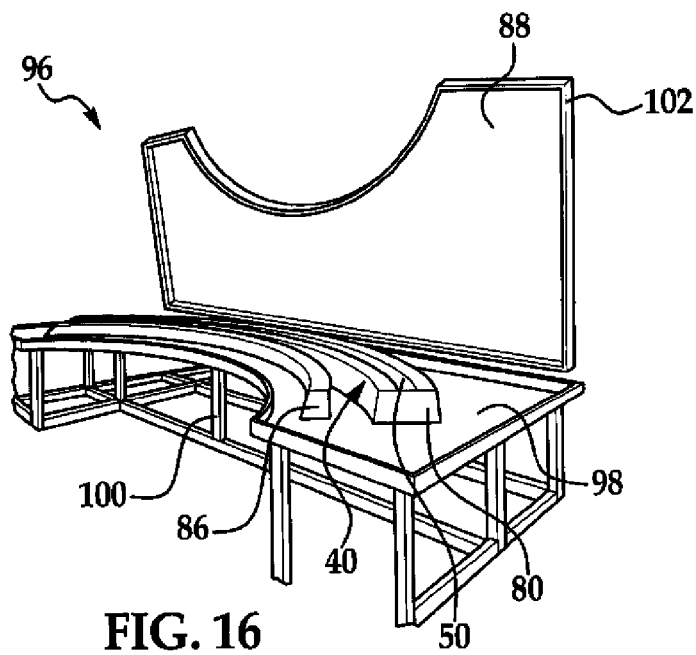
FIG. 16 is a perspective illustration of drape forming apparatus with a flexible membrane swung to an open position.
Figure 17:
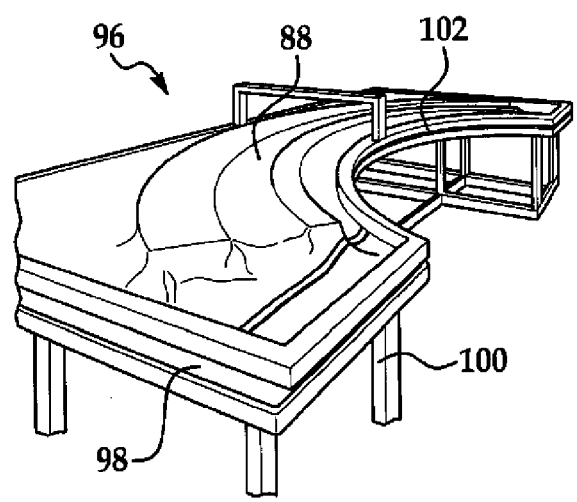
FIG. 17 is an illustration similar to FIG. 16 but showing the flexible membrane having been closed and drawn down around the tool assembly.

The forming process described above may be performed in a drape forming apparatus 96 shown in FIGS. 16 and 17. The bag 88 may comprise a gas impermeable membrane, formed, for example and without limitation, of silicone which is mounted in a frame 102 that is pivotally attached to a vacuum table 98 supported on legs 100. The vacuum table 98 includes ports or perforations (not shown) which allow air to be drawn through the table 98. The forming mandrel 80 along with the ply stack 50 and the layup shelf 86 may be placed on the vacuum table 98 with the frame 102 closed against the vacuum table 98.

As shown in FIG. 17, a vacuum system (not shown) may be used to evacuate the air in the sealed cavity formed by the frame 102 and table 98. Evacuation of this cavity results in the membrane 88 being drawn down over the forming mandrel 80, thus forming the edge 50a down over the front face 80b of the forming mandrel 80. The layup shelf 86 partially supports the membrane 88 during the formation process, thereby controlling and directing the force applied to the edge 50a of the membrane 88.

The inner chord 40 having been fully formed, the next step in the fabrication method is illustrated in FIGS. 18-21 in which the outer chord 38 is formed. The outer chord 38 may be fabricated by tension, hot drape forming using, for example and without limitation, the drape forming apparatus 124 shown in FIG. 19. The drape forming apparatus 124 includes a heated vacuum table 130 held in a lower frame 128 supported by legs 134. An upper, pivotal frame 126 includes a gas impermeable membrane 132 which may comprise silicone, for example. A tool in the form of a forming/cure mandrel 106 and a contoured block 112 are supported on the vacuum table 130 and are covered by the membrane 132 when the frame 126 is closed and sealed against the lower frame 128.

Figure 18:
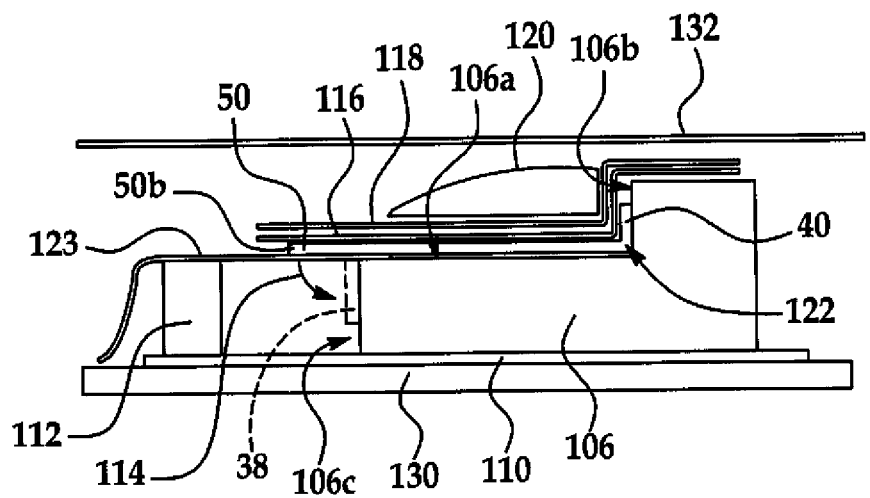
FIG. 18 is a sectional illustration of a hot drape forming apparatus for drape forming the outer chord of the frame section.
Figure 19:
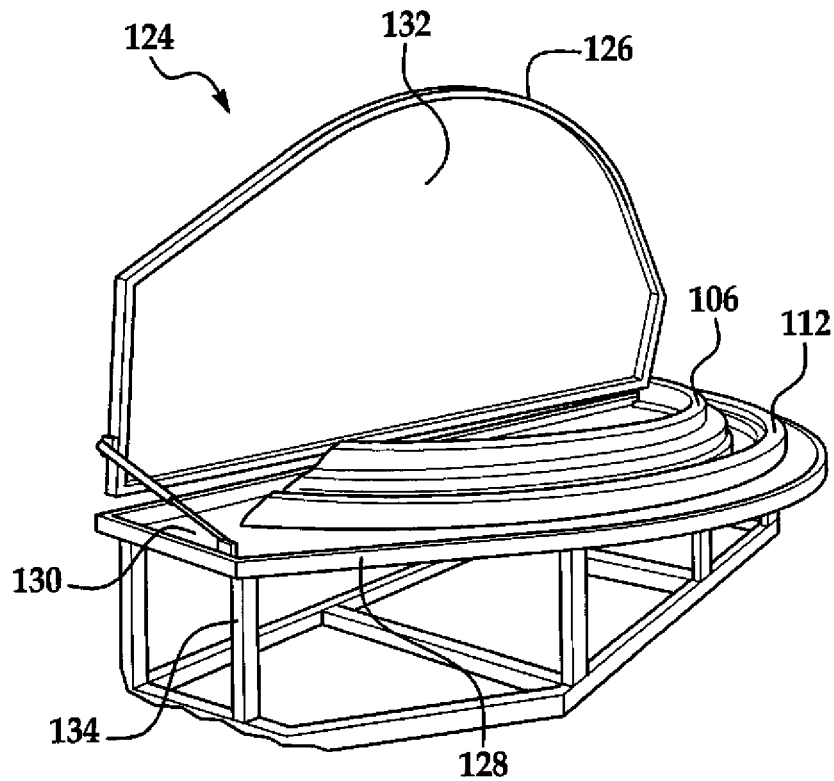
FIG. 19 is a perspective illustration of the hot drape forming apparatus shown in FIG. 18.

As best seen in FIG. 18, the forming/cure mandrel 106 includes a flat upper tool surface 106a which supports the ply stack 50. The second flat surface 106b on the forming/cure mandrel 106 extends upwardly from the tool surface 106a and engages the inner chord 40. The forming/cure mandrel 106 further includes a third surface 106c which extends downwardly from the tool surface 106a and is used to form the outer chord 38.

The forming/cure mandrel 106 is supported on the vacuum table 130. An optional breather 110 formed from fiberglass or other suitable material may be placed between the vacuum table 130 and the forming/cure mandrel 106. A contoured intensifier 120 may be placed over the ply stack 50 in order to assure that the radius 122 is fully maintained adjacent the inner chord 40. A ply 116 of a material such, but not limited to Teflon® as well as a breather 118 may be placed between the intensifier and the ply stack 50. An additional layer 123 of FEP may be placed between an edge of the forming/cure mandrel and the ply stack 50. The FEP layer 123 is draped over the block 112, which in combination, function to control the angle at which the bag membrane 132 applies pressure to the outer edge 50b of the ply stack 50 during the drape forming process.

The outer chord 38 may be hot draped formed over the forming/cure mandrel 106 which may then be heated within an oven or by other means such as infrared lamps, to a preselected temperature for example, of approximately 140 degrees F. A vacuum is drawn in the bag membrane 132 and held for preselected periods of time. During the tension controlled hot drape forming process, the fibers can slide within a ply as a result of the viscosity of the matrix resin decreasing due to heating. This allows the fibers to bunch or spread, or otherwise rearrange themselves, as needed. Maintaining tension under the stack 50 minimizes wrinkling. The radius intensifier 120 holds the inner chord radius 122 (40a in FIG. 3) while forming the outer chord 38.

Figure 20:
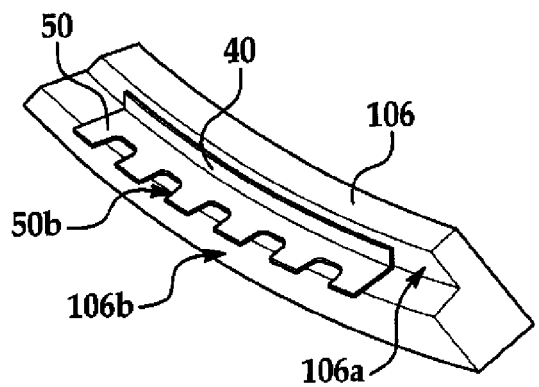
FIG. 20 is a perspective illustration of a forming/cure mandrel which comprises part of the drape forming tool assembly of FIG. 18, and depicting the partially formed frame section positioned thereon.
Figure 21:
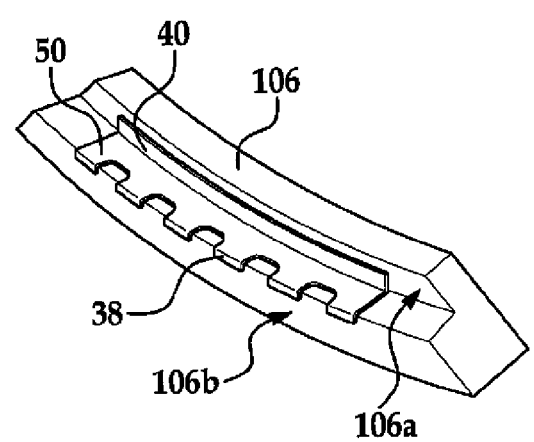
FIG. 21 is an illustration similar to FIG. 20 but showing the outer chord having been fully formed over the forming/cure mandrel.

FIG. 20 illustrates the partially formed ply stack 50 positioned on the forming/cure mandrel 106 with the formed inner chord 40 held against the tool surface 106a. The outer edge 50b of the ply stack 50 is cantilevered over the tool surface 106b. As shown in FIG. 21, when the membrane 132 is drawn down over the forming/cure mandrel 106, the membrane 132 applies pressure to the outer edge 50b at an angle that is partially controlled by block 112. The edge 50b of the ply stack 50 is then bent downwardly in the direction of the arrow 114 until it is fully formed against the tool surface 106c and forms the outer chord 38.

Figure 22:
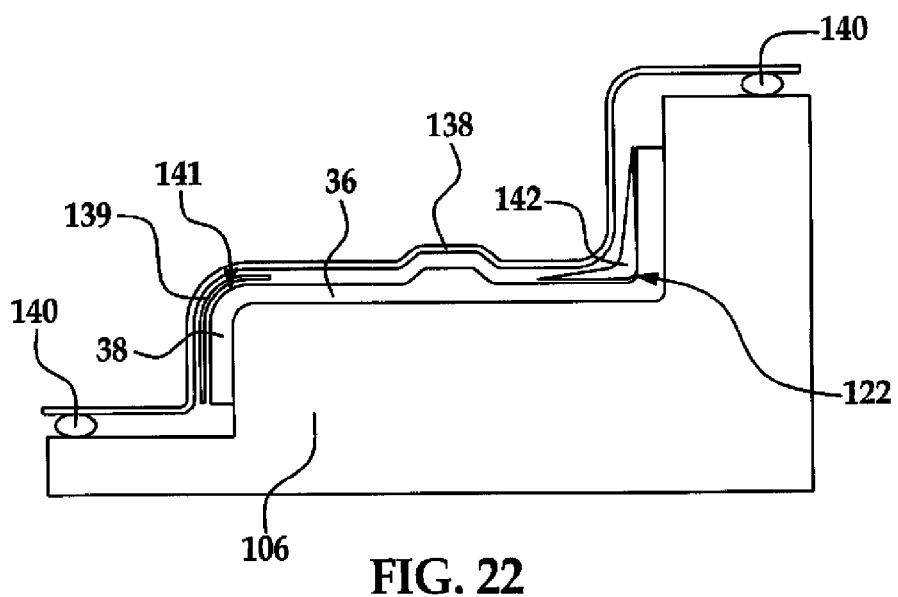
FIG. 22 is a sectional illustration of a forming/cure mandrel bag assembly used for curing the frame section.

When the inner and outer chords 38, 40 of frame section 36 having been formed, it is then necessary to cure the frame section 36, and in this connection, attention is directed to FIG. 22. The formed frame section 36 and forming/cure mandrel 106 are removed from the hot drape forming apparatus 124. A caul plate 139 may be placed over the outer chord 38 in order to assist in compacting the radius 141. Similarly, an intensifier 142 may be installed in order to aid in the compaction of the radius 122. A conventional vacuum bag 138 is placed over the frame section 36 and sealed by a seal 140 to the cure mandrel 136. A breather (not shown) and a peel ply (not shown) of FEP may also be placed between the forming/cure mandrel 106 and the bag 138.

Figure 23:
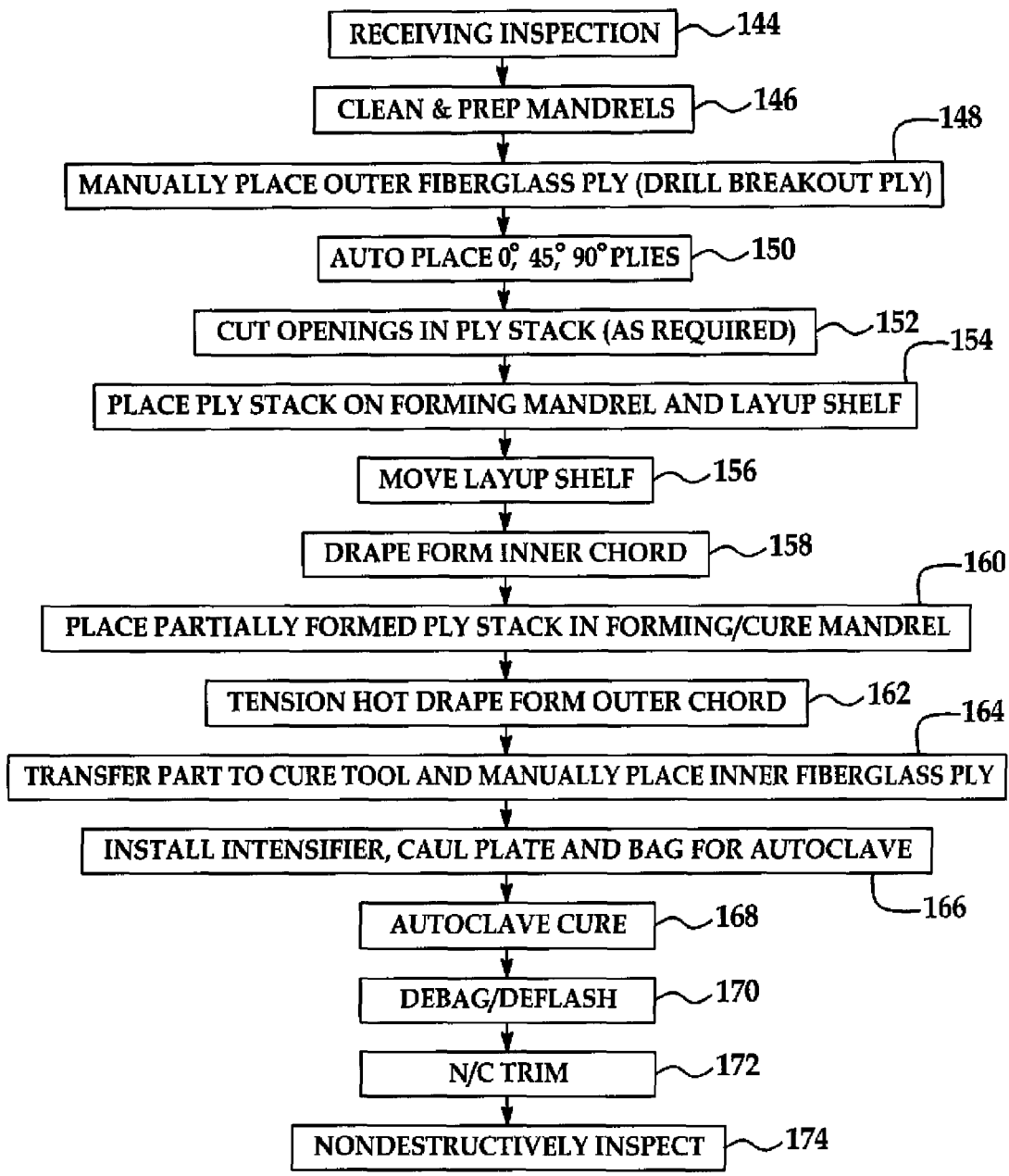
FIG. 23 is a flow diagram illustrating a method for fabricating continuous, contoured composite structures.

Attention is now directed to FIG. 23 which illustrates the overall steps used in the method for producing contoured composite structures. Raw materials, including pre-preg fiber tows and/or tape are received and inspected at 144. At 146, the previously discussed forming mandrel 80, and the forming/cure mandrel 106 are cleaned and prepared. Next, at 148, an outer fiberglass ply may be placed over the forming mandrel 80.

At step 150, all of the various plies in the stack 50 are laid down using one or more AFP machines 58. The flat ply stack 50 having been formed, the mousehole cutouts 53 are then put in the ply stack 50, as required at step 152. Next, at step 154, the ply stack 50 is placed on the forming mandrel 80 and layup shelf 86. Then at 156, the layup shelf 86 is moved to a position where it is used in the subsequent forming process.

At step 158, the inner chord 40 is formed using the drape forming technique described above.

At step 160, the partially formed ply stack 50 is placed in the forming/cure mandrel 106. At 162 the outer chord 38 is hot draped formed on the forming/cure mandrel 106. Next, at step 164, the formed frame section 36 is transferred to the cure tool 136 and an inner fiberglass ply is placed over the frame. Next, at 166, the caul plate 139 and the intensifier 142 are installed, following which the assembly is vacuum bagged in preparation for autoclave curing. At 168 the frame section 36 is cured in an autoclave (not shown) following which, at 170, the cured, fully formed frame section 36 is debagged and deflashed. The frame section 36 may be trimmed at 172 using a numerically controlled cutter and the trimmed frame section 36 may then be inspected at 174 using conventional nondestructive evaluation techniques.

Figure 24:
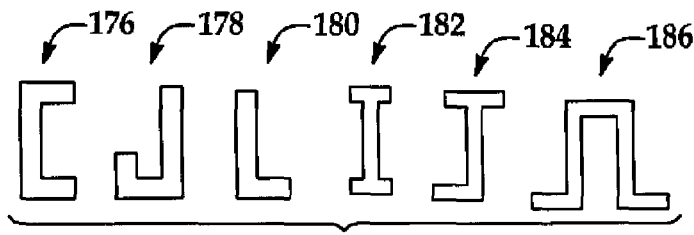
FIG. 24 illustrates cross sectional geometries of continuous composite structures that may be formed according to the disclosed embodiments.

While the disclosed embodiments illustrate use of the method to fabricate a contoured composite structure having a Z-shaped cross section, various other contoured structures are possible in which one or more legs extend outwardly from a structural feature such as a web. For example, as shown in FIG. 24, the disclosed embodiments may be employed to fabricate contoured, continuous structures having other leg configurations or cross sectional shapes, such as, without limitation, a C shape 176, a J shape 178, an L shape 180, an I shape 182, a modified J shape 184 and one or more forms of a U shape 186.

Figure 25:
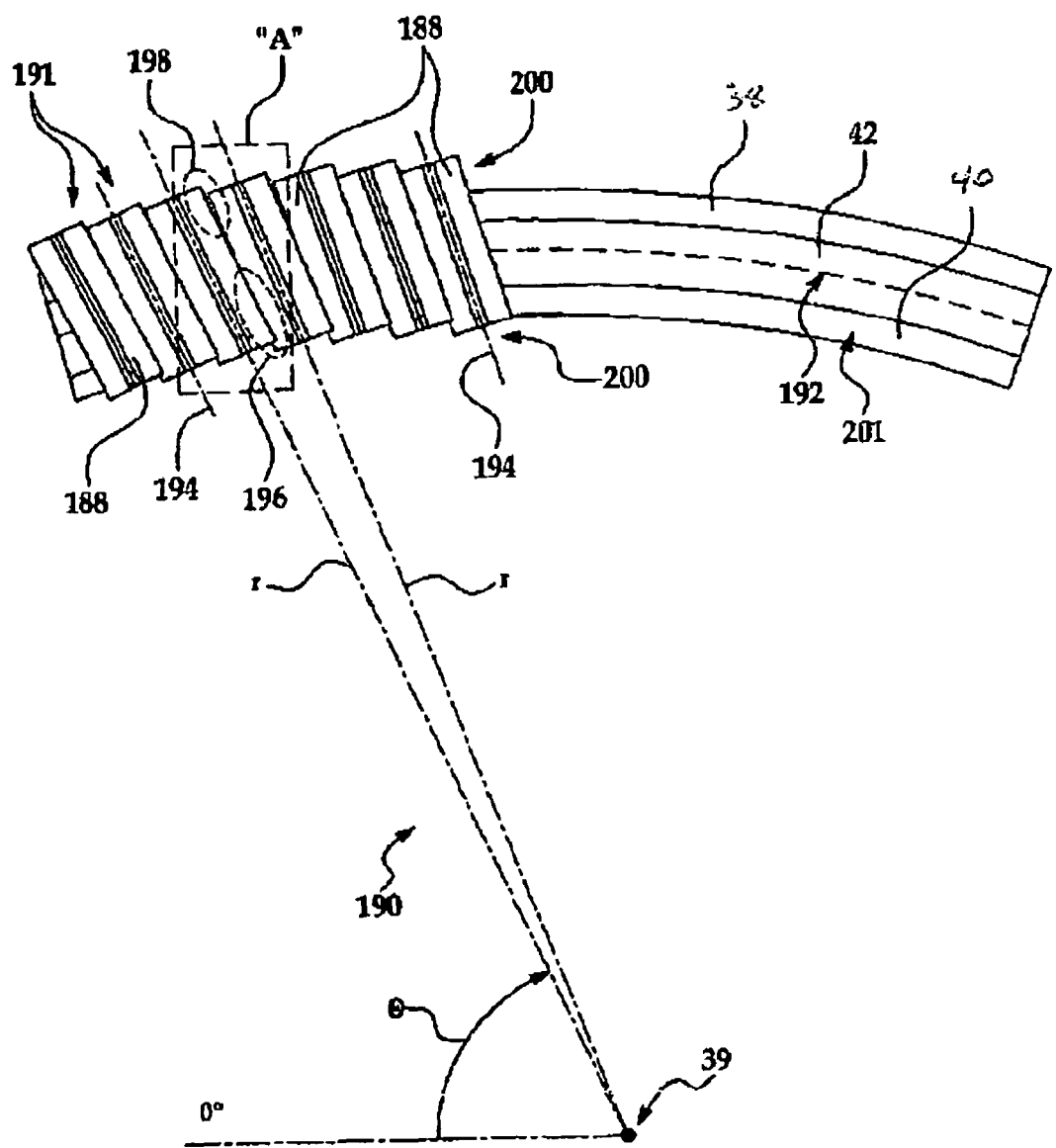
FIG. 25 illustrates a plan view of tape segments being placed on a substrate in relation to their alignment in a polar coordinate system.
Figure 26:
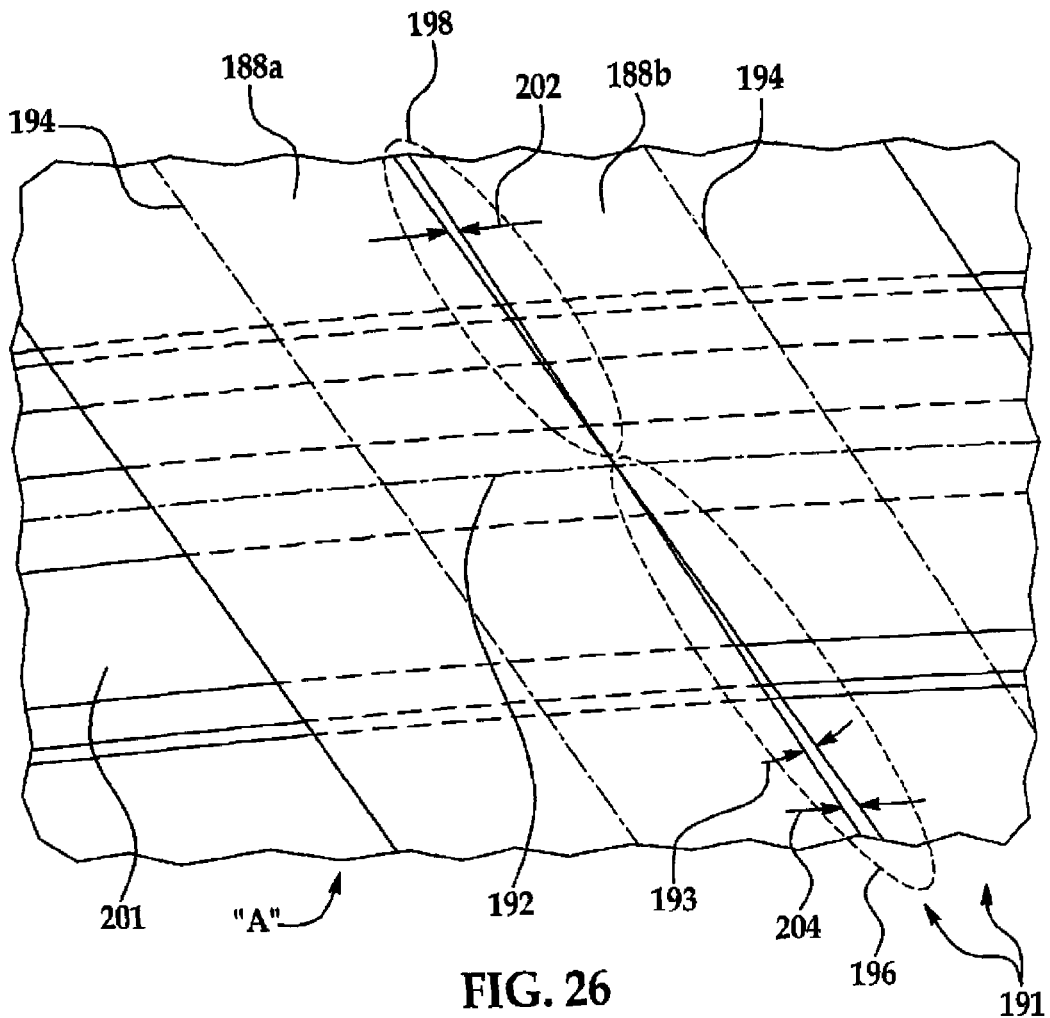
FIG. 26 is an enlarged illustration of the area designated as "A" in FIG. 25.

Attention is now directed to FIGS. 25 and 26 which illustrate another method for laying up a contoured ply 201 using overlapping ply segments 188 formed of substantially constant width, unidirectional pre-preg fiber tape. The constant width ply segments 188 may be cut from tape drawn from a spool (not shown) of standard or non-standard width tape. In the example shown in FIGS. 25 and 26, the ply segments 188 are substantially rectangular in shape, however, they may have other shapes, providing that the ply segments 188 have substantially the same widths. The ply segments 188 are placed on a substrate (not shown) and arranged along the contoured centerline 192 of a contoured ply 201 being laid up. Each of the ply segments 188 extends radially beyond the inner and outer chords 38, 40 respectively, to form extensions 200 that are later trimmed so that the full ply 201 formed by the ply segments 188 substantially matches the contour of the structure 36 (FIG. 2).

Each of the ply segments 188 includes a longitudinal centerline 194 that is aligned during the placement process with a radial coordinate "r" originating from a pole 39 in a polar coordinate system 190. Each of the centerlines 194 form an angle θ relative to a reference line shown as "0°" in FIG. 25. The polar coordinate system 190 is used to define one or more contours of the structure 36 (FIG. 2). According to the disclosed embodiments, the constant width tape segments 188 are placed in overlapping relationship 191 relative to each other such that the amount of overlap is preferably held substantially constant. As each ply segment 188 is placed, it is oriented at a slight angle 193 (FIG. 26) from the previously placed, adjacent segment 188. Placing the ply segments 188 in overlapping relationship 191 results in adjacent ones of the ply segments 188a, 188b forming a pie-shaped lap 196 near the inner chord 40, and a pie-shaped gap 198 adjacent the outer chord 38. The laps 196 and gaps 198 can be adjusted to meet structural requirements of a particular application by changing the width of the tape segments 188. The constant width tape layup method described above allows layup of non-zero plies at a relatively fast rate, even on small, highly contoured composite structures.

As best seen in FIG. 26, the lap 196 generally extends from the centerline 192 of the ply 201 in which the width 204 of the lap 204 grows progressively larger with increasing distance from the centerline 192. Similarly, the width 202 of the gap 198 between adjacent ply segments 188a, 188b grows larger with increasing distance from the centerline 192. According to the disclosed embodiments, both the laps 196 and the gaps 198 are substantially minimized. In contrast to the periphery cut tape segments 74 used in the embodiment shown in FIG. 11, the use of simple, end cut ply segments 188 of constant width facilitate the use of automated equipment (discussed below) to place the ply segments 188 in a predetermined manner that minimizes the laps 196 and gaps 198.

The overlapping placement of constant width ply segments 188 as described above results in a ply 201 having substantially evenly displaced discontinuities defined by the laps 196 and gaps 198.

The width chosen for the tape segments 188 will vary with the application. Narrower tape segments 188 can be utilized in order to reduce the lap 196 and/or the gap 198. Similarly, wider tape widths may be employed to increase the lay-down rate. Laps 196 and gaps 199 for 45 degree plies 201 can be reduced by changing the ply segments 188 to a +/−60 degree orientations.

Figure 27:
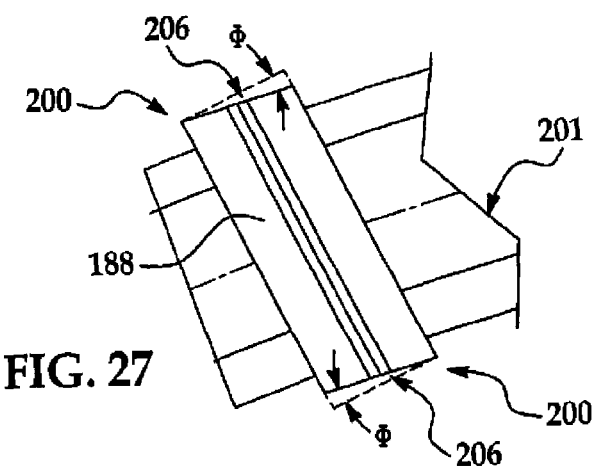
FIG. 27 is a plan view illustration of a single tape segment showing an alternate end cut.

Referring to FIG. 27, the overlapping ends 200 of each tape segment 188 may be cut at 206, at an angle Φ so as to substantially match the outer contours of the inner chord 38 and the outer chord 40, respectively. The cut ends 206 of the segments 188 therefore may substantially follow the contour of the structure 36 (FIG. 2), resulting in the segment 188 having a generally trapezoidal shape.

Figure 28:
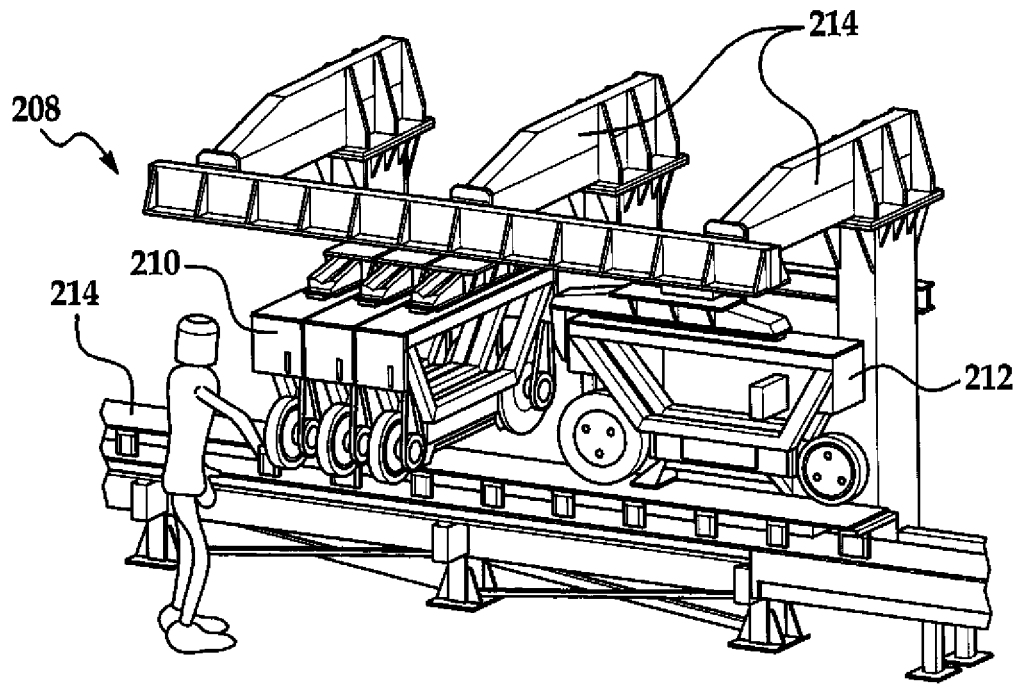
FIG. 28 is a perspective illustration of an automatic tape placement machine.

In accordance with the disclosed embodiments, each of the ply segments 188 may be placed on a substrate (not shown) using automatic tape placement equipment 208 shown in FIG. 28 which aligns the centerlines 194 (FIGS. 25 and 26) in polar orientations related to the contour of the structure 36 (FIG. 2). Referring to FIG. 28, the automatic tape placement equipment 208 includes pivotal tape placement heads 210, 212 mounted on a gantry 214 for pivotal motion relative to the contour of a substrate 214, which may be a tool. Each of the heads 210, 212 includes a supply of composite tape (not shown) along with cutting and placement mechanisms (not shown) that cut the tape to length and place the cut lengths of tape on the substrate 214. The tape heads 210, 212 and/or the substrate 214 are moved relative to each other so that the tape heads 210, 212 traverse across the substrate 214 and place composite tape automatically, typically under the control of a CNC controller (not shown). Additional details of a suitable automatic tape placement machine 208 are disclosed in U.S. Pat. No. 7,137,182 issued Nov. 21, 2006, the entire contents of which are incorporated by reference herein.

Figure 29:
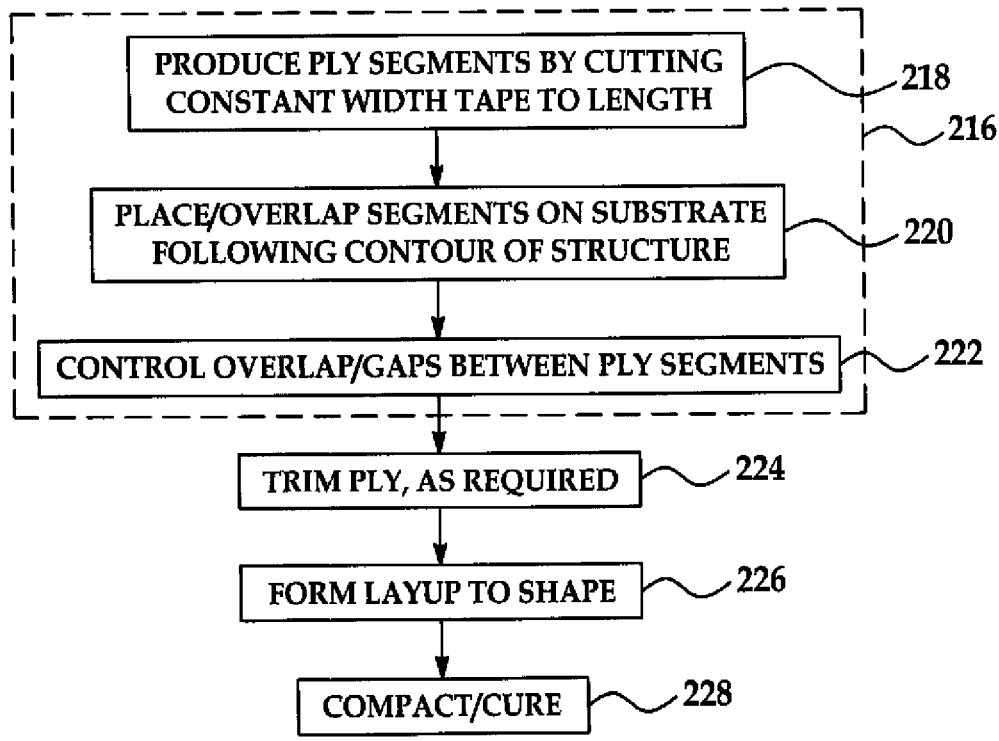
FIG. 29 illustrates a flow diagram of a method of fabricating a contoured composite structure using constant width tape segments.

Attention is now directed to FIG. 29 which illustrates the overall steps of method for making a contoured composite structure having one or more legs. A ply 201 is laid in a series of steps 216 that begin at 218, with the production of the ply segments 188 by cutting constant width, unidirectional fiber pre-preg tape to the desired lengths. Next at 220, the ply segments 188 are placed on a substrate in side-by-side, overlapping relationship which follows the contour of the composite structure. During the placement process, the longitudinal centerlines 194 of the ply segments 188 are aligned in a polar orientation related to the contour of the structure. At 222, the overlap 196 and gaps 198 between adjacent ply segments 188a, 188b is controlled. Typically, this control is implemented automatically when using automated tape placement equipment, of the type shown in FIG. 28.

At 224, each complete ply 201, or a stack of plies 201 may then be trimmed to final shape, as required. At 226, the completed ply stack 50 (FIG. 8) may be formed to shape using techniques previously described herein, which may include forming one or more legs. Finally, at 228, the shaped ply stack 50 may be compacted and cured.

Figure 30:
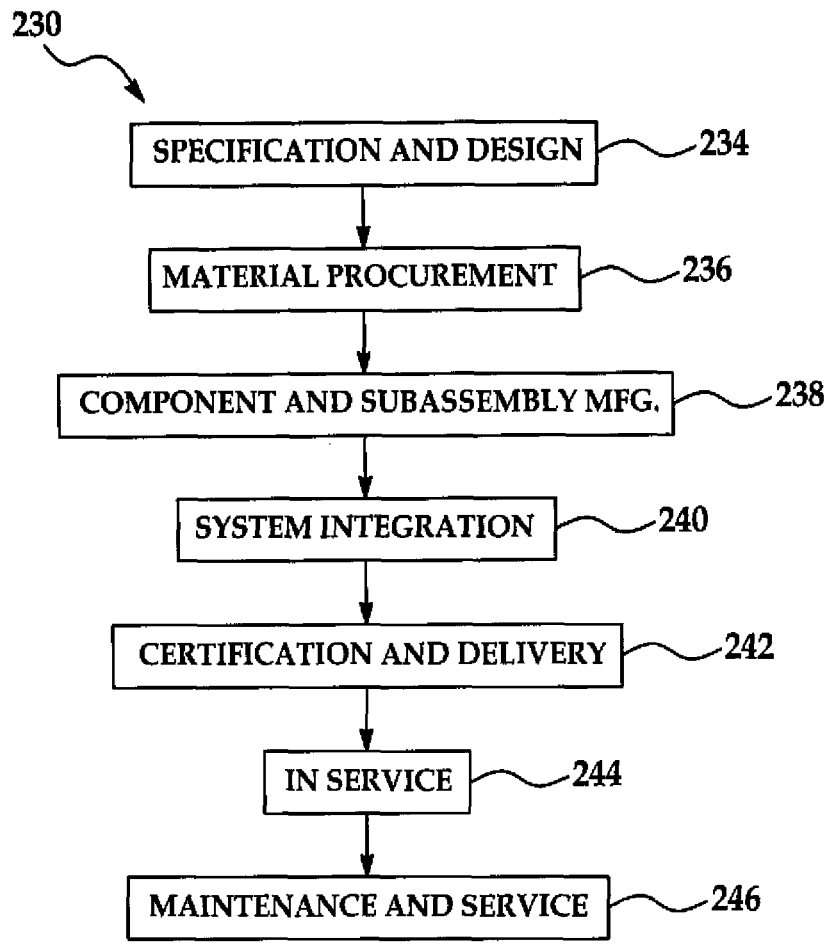
FIG. 30 illustrates a flow diagram of aircraft production and service methodology.
Figure 31:
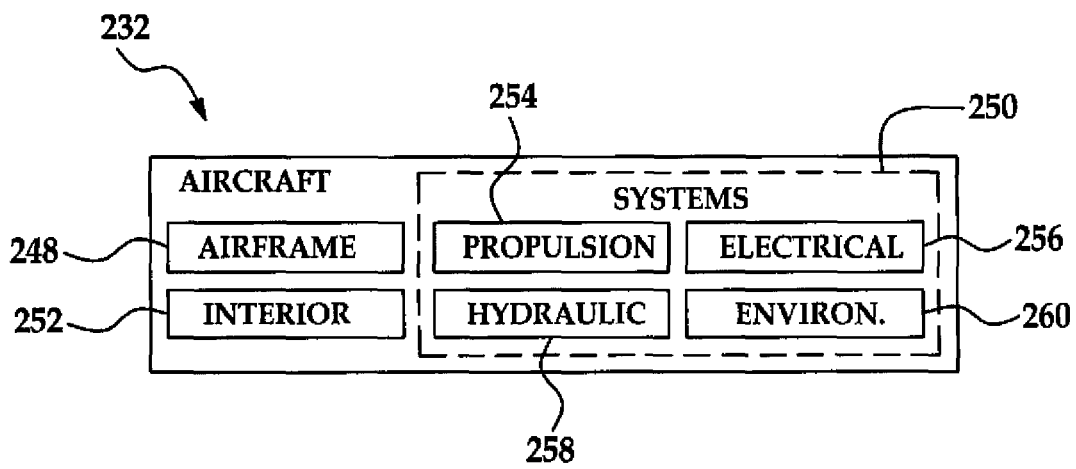
FIG. 31 illustrates a block diagram of an aircraft.

Embodiments of the disclosure may find use in a variety of potential applications, particularly in the transportation industry, including for example, aerospace, marine and automotive applications. Thus, referring now to FIGS. 30 and 31, embodiments of the disclosure may be used in the context of an aircraft manufacturing and service method 230 as shown in FIG. 30 and an aircraft 232 as shown in FIG. 31. Aircraft applications of the disclosed embodiments may include, for example, without limitation, composite stiffened members such as stiffeners, beams, and stringers, to name only a few. During pre-production, exemplary method 230 may include specification and design 234 of the aircraft 232 and material procurement 236 in which the disclosed contoured structures are specified for use in the aircraft 232. During production, component and subassembly manufacturing 238 and system integration 240 of the aircraft 232 takes place, in which various components and subassemblies are fabricated using the disclosed method. Thereafter, the aircraft 232 may go through certification and delivery 242 in order to be placed in service 244. While in service by a customer, the aircraft 232 is scheduled for routine maintenance and service 246 (which may also include modification, reconfiguration, refurbishment, and so on), which may include the use of the disclosed contoured structures.

Each of the processes of method 230 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 31, the aircraft 232 produced by exemplary method 230 may include an airframe 248 with a plurality of systems 250 and an interior 252. Examples of high-level systems 250 include one or more of a propulsion system 254, an electrical system 256, a hydraulic system 258, and an environmental system 260. Any number of other systems may be included. Although an aerospace example is shown, the principles of the disclosure may be applied to other industries, such as the marine and automotive industries.

Systems and methods embodied herein may be employed during any one or more of the stages of the production and service method 230. For example, components or subassemblies corresponding to production process 208 may be fabricated or manufactured in a manner similar to components or subassemblies produced while the aircraft 232 is in service. Also, one or more apparatus embodiments, method embodiments, or a combination thereof may be utilized during the production stages 238 and 240, for example, by substantially expediting assembly of or reducing the cost of an aircraft 232. Similarly, one or more of apparatus embodiments, method embodiments, or a combination thereof may be utilized while the aircraft 232 is in service, for example and without limitation, to maintenance and service 246.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a contoured composite structure, comprising:

laying up a composite charge, including laying up at least one ply of uni-directional fiber pre-preg ply segments, including placing the ply segments in side-by-side, overlapping relationship and aligning longitudinal centerlines of the ply segments in a polar orientation related to the contour of the structure, adjacent ply segments overlapping and forming pie shaped laps in an area adjacent an inner chord comprising said contour and forming pie shaped gaps in an area adjacent an outer chord comprising said contour, the ply segments positioned in overlapping relationship in a substantially flat configuration;

cutting a first end and a second end of the ply segments so as to form an angle in each ply segment that substantially matches the inner chord and the outer chord related to the contour of the structure;

forming the composite charge substantially into the shape of the structure so as to alter at least a portion of the composite charge from the flat configuration; and curing the composite charge.

2. The method of claim 1, wherein placing the ply segments in side-by-side relationship includes maintaining a substantially constant amount of said overlap between the ply segments as the ply segments are being placed.

3. The method of claim 1, wherein laying up the ply includes cutting the ply segments from a length of composite tape.

4. The method of claim 1, wherein said gaps are created between adjacent ones of the ply segments due to the polar orientation of the ply segments, and laying up the ply further includes substantially minimizing the gaps.

5. The method of claim 1, wherein placing the ply segments and aligning the centerlines is performed by an automatically controlled tape application head.

6. The method of claim 1, wherein laying up the ply includes producing the ply segments by cutting segments from a length of composite fiber tape.

7. A method of fabricating a contoured composite structure, comprising:

producing a composite charge using an automatically controlled tape placement head, including using the head to place each of a plurality of substantially constant width prepreg tape segments in side-by-side, overlapping relationship on a substrate and to align longitudinal centerlines of the tape segments in a polar orientation related to the contour of the structure, adjacent tape segments overlapping in an area adjacent an inner chord comprising said contour so as to form pie shaped laps and forming pie shaped gaps in an area adjacent an outer chord comprising said contour, the ply segments positioned in a substantially flat configuration;

cutting a first end of the plurality of segments proximate the inner chord and a second end of the plurality of segments proximate the outer chord so as to form an angle in each segment that substantially matches the inner chord and the outer chord related to the contour of the structure;

forming the composite charge substantially into the shape of the structure so as to alter at least a portion of the composite charge from the flat configuration; and curing the composite charge.

8. The method of claim 7, wherein using the head to place the tape segments include moving the head across a substrate and cutting a length of composite tape into segments.

9. The method of claim 7, wherein using the head to align the tape segments includes aligning the longitudinal centerlines of the tape segments along radial coordinates in a polar coordinate system.

10. The method of claim 7, wherein using the head to place the tape segments includes using the head to maintain a substantially constant amount of said overlap between the tape segments as the tape segments are being placed.

11. The method of claim 7, wherein said gaps are created between adjacent ones of the tape segments due to the polar orientation of the tape segments, and using the head to place the tape segments includes substantially minimizing the gaps.

12. A method of fabricating a contoured composite structure, comprising:

forming a substantially flat stack of fiber reinforced, pre-preg plies, including individually placing composite fiber tape segments in side-by-side, overlapping relationship and in a polar orientation related to the contour of the structure, the amount of overlapping being substantially constant among the ply segments;

cutting a first end of the plurality of segments proximate an inner chord of the contour and a second end of the plurality of segments proximate an outer chord of the contour so as to form an angle in each segment that substantially matches the inner chord and the outer chord related to the contour of the structure;

forming the flat stack of fiber reinforced, pre-preg plies substantially into the shape of the structure so as to alter at least a portion of the plies from the flat stack configuration; and curing the fiber reinforced, pre-preg plies.

13. The method of claim 12, wherein placing the tape segments in side-by-side relationship includes maintaining a substantially constant amount of said overlap between the tape segments as the tape segments are being placed.

14. The method of claim 12, further comprising cutting the tape segments from a length of composite tape.

15. The method of claim 12, wherein gaps are created between adjacent tape segments due to the polar orientation of the tape segments.

16. The method of claim 12, wherein placing the tape segments is performed by an automatically controlled tape application head.

17. The method of claim 1, wherein the ply segments are positioned in the overlapping relationship in a substantially flat configuration such that the amount of overlapping is substantially constant among the ply segments.

18. The method of claim 7, wherein the ply segments are positioned in the overlapping relationship such that the amount of overlapping is substantially constant among the ply segments.

* * * * *